United States Patent [19]

Burst

[11] Patent Number: 4,810,021

[45] Date of Patent: Mar. 7, 1989

[54] AERODYNAMIC BRAKE COOLING SPOILER

[75] Inventor: Hermann Burst, Rutesheim, Fed. Rep. of Germany

[73] Assignee: Dr.-ing h.c.F. Porsche Aktiengesellschaft, Fed. Rep. of Germany

[21] Appl. No.: 127,589

[22] Filed: Dec. 3, 1987

Related U.S. Application Data

[63] Continuation of Ser. No. 928,020, Nov. 7, 1986, abandoned.

[30] Foreign Application Priority Data

Nov. 30, 1985 [DE] Fed. Rep. of Germany ....... 3542376

[51] Int. Cl.⁴ ............................................. B62D 35/02
[52] U.S. Cl. .................................. 296/180.1; 296/208
[58] Field of Search .................... 296/1 S, 91, 194, 208

[56] References Cited

U.S. PATENT DOCUMENTS

| 3,524,672 | 8/1970 | Rawlings | 296/1 S |
|---|---|---|---|
| 3,696,732 | 10/1972 | Rodgers | 296/91 X |
| 3,884,516 | 5/1975 | Gallion et al. | 296/1 S |
| 4,343,506 | 8/1982 | Saltzman | 296/91 X |
| 4,378,097 | 3/1983 | Ferguson et al. | 244/53 B |
| 4,379,582 | 4/1983 | Miwa | 296/1 S |
| 4,411,443 | 10/1983 | Pollard | 280/281 P |
| 4,455,045 | 6/1984 | Wheeler | 296/1 S |
| 4,569,551 | 2/1986 | Rauser et al. | |
| 4,653,788 | 3/1987 | Di Giusto | 296/1 S |

FOREIGN PATENT DOCUMENTS

| 192934 | 9/1986 | European Pat. Off. | 296/1 S |
|---|---|---|---|
| 3247989 | 6/1984 | Fed. Rep. of Germany | 296/194 |
| 40916 | 4/1978 | Japan | 296/1 S |
| 895783 | 1/1982 | U.S.S.R. | 296/1 S |
| 1073148 | 2/1984 | U.S.S.R. | 296/1 S |

OTHER PUBLICATIONS

J. C. Whitney, Catalog 463, Oct. 1985, p. 73, I.R.O.-C-Type Spoiler.
Aerodynamic des Automobils, Dr.-Ing. Wolf-Heinrich Hucho (Herausgeber), 1981, pp. 245-247.

Primary Examiner—Dennis H. Pedder
Attorney, Agent, or Firm—Barnes & Thornburg

[57] ABSTRACT

An air-guidance device is provided for the front of a vehicle and is adapted to be attached near an outside edge near the bottom of the motor vehicle. A portion of the device is located on the bottom of the vehicle and extends longitudinally towards a wheel. This portion is provided with air-guiding channels used for cooling the brakes. Each air-guiding channel is constructed such that the bottom portion of the channel facing the road is open over at least a partial area of its longitudinal length. This arrangement provides cooling of the brakes and is simple to construct and mount to a vehicle.

16 Claims, 4 Drawing Sheets

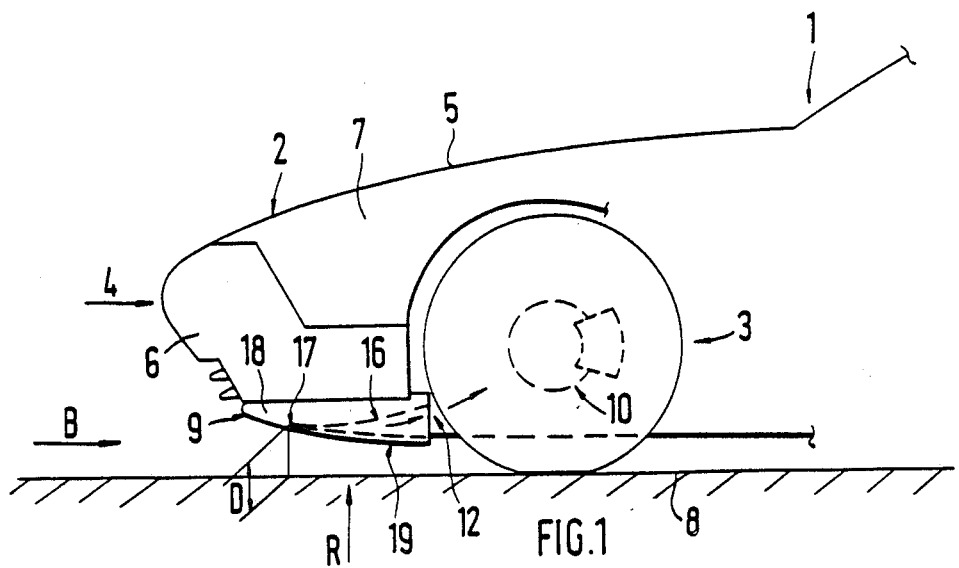
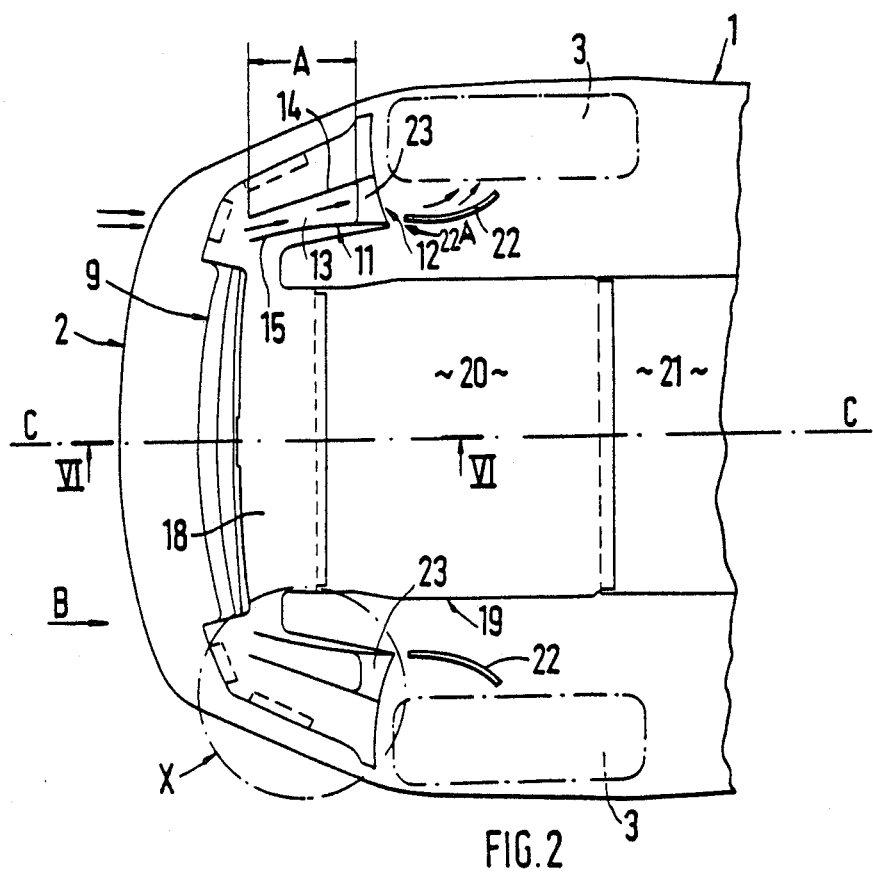

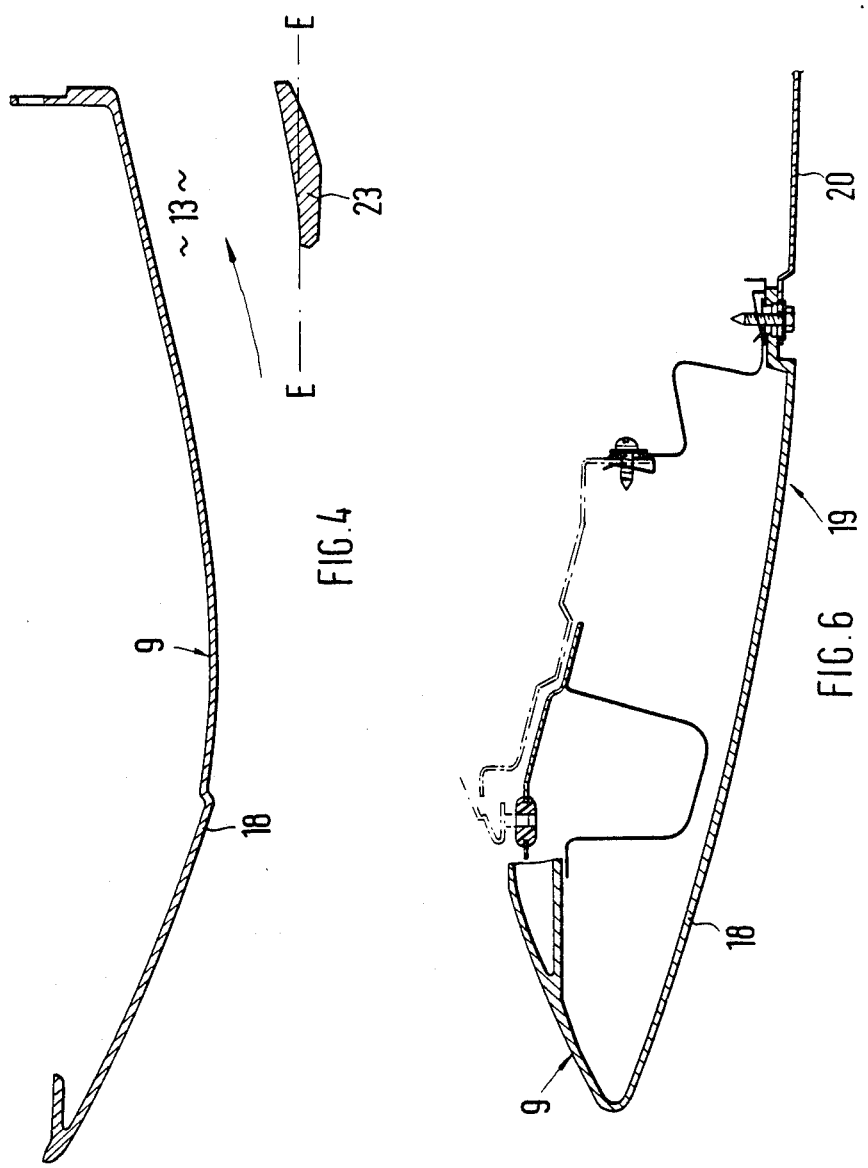

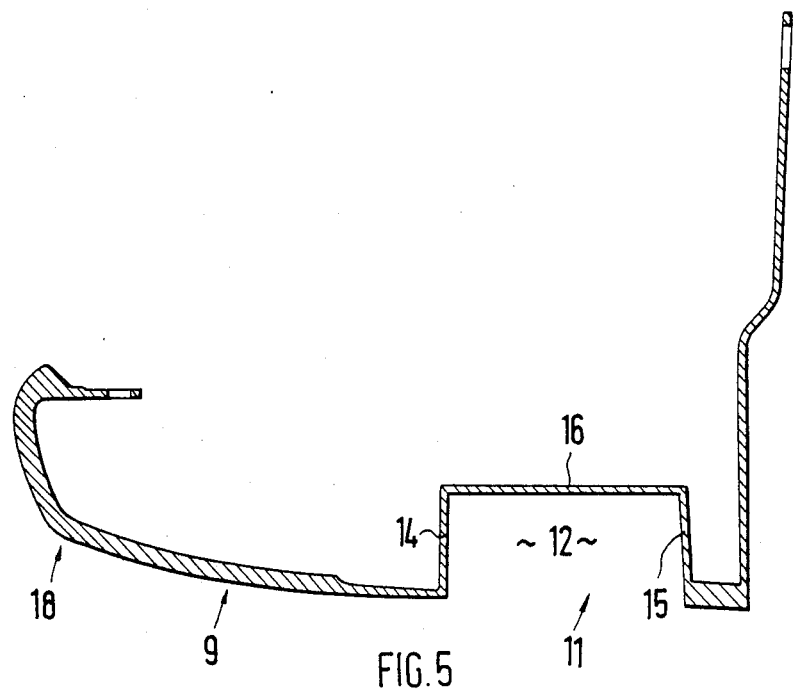
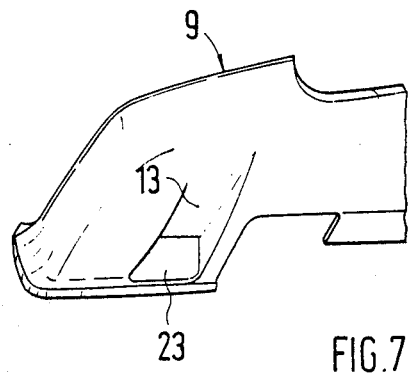

4,810,021

AERODYNAMIC BRAKE COOLING SPOILER

This is a continuation of application Ser. No. 928,020 filed Nov. 7, 1986, abandoned.

BACKGROUND AND SUMMARY OF THE INVENTION

This invention relates to a motor vehicle having an air guiding device, preferably a one piece air-guiding device attached to the vehicle on the bottom side in front of the wheels, with air-guiding channels used to direct air for cooling the brakes.

This type of arrangement has been contemplated in Technical Manual: *Aerodynamik des Automobils,* by Wolf-Heinrich Hucho, Vogel Publishers, Pages 246 and 247, Illustration 6.28. The front-end part that is represented by an apron has muff-shaped cooling-air inlet openings. A hose is connected to each opening forming an air-guiding channel directing air towards the brake of the adjacent wheel. This arrangement has the disadvantage that the mounting of the air-guiding channel is time-consuming because the hose, on one side, is connected with the apron and, on the other side, with a part of the chassis or the body. Also, additional fastening elements (hose clamps, screws, brackets and similar means) are required for attachment of the hose. In addition, this motor vehicle arrangement is open on the bottom side causing swirling of the air current flowing under the vehicle. This swirling increases the drag coefficient of the motor vehicle.

It is an objective of the invention to provide an air-guiding arrangement for the cooling of the brakes that is simple with respect to construction and mounting.

It is a further object to provide an aerodynamic device that when attached to a vehicle does not increase the drag coefficient of the vehicle.

These objectives are achieved according to preferred embodiments of the invention by providing a one-piece air-guidance device attached to the front portion of the vehicle. This device has air-guiding channels for cooling the brakes. This cooling apparatus is simple to construct and mount. By arranging air-guiding channels in a section of the front-end spoiler which forms an underfloor covering, the drag coefficient of the vehicle is reduced.

Further objects, features, and advantages of the present invention will become more apparent from the following description when taken with the accompaying drawings which show, for purposes of illustration only, an embodiment in accordance with the present invention.

BRIEF DESCRIPTION OF THE DRAWINGS

FIG. 1 is a partial lateral schematic view of a front portion passenger car equipped with a preferred embodiment of the present invention;

FIG. 2 is a schematic view taken in the direction of the Arrow R of FIG. 1;

FIG. 4 is a sectional view taken along Line IV—IV of FIG. 3;

FIG. 5 is a sectional view taken along Line V—V of FIG. 3;

FIG. 6 is an enlarged sectional veiw taken along Line VI—VI of FIG. 2; and

FIG. 7 is a perspective partial view of the front-end part shown in small scale.

DETAILED DESCRIPTION OF THE DRAWINGS

Figure 3:
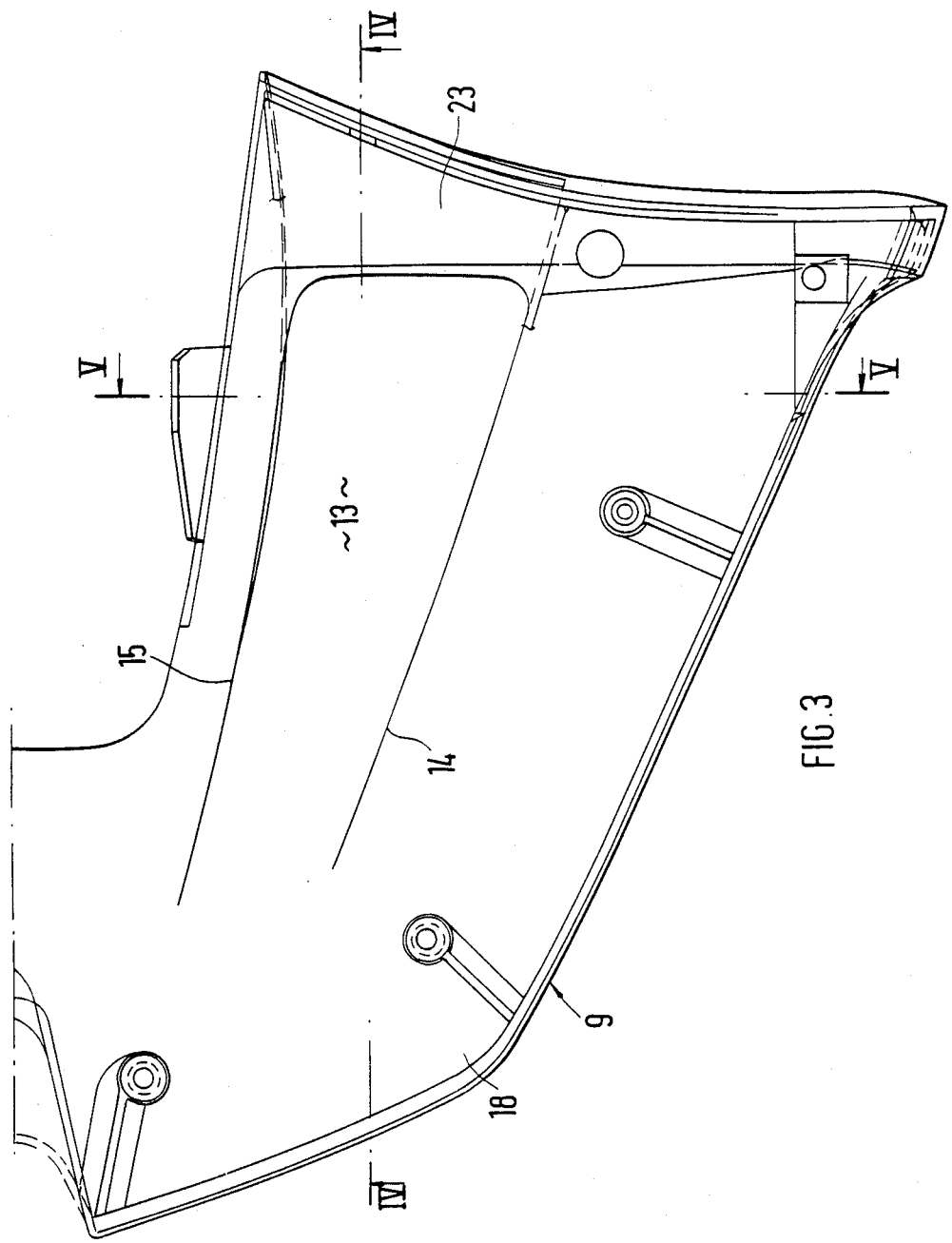
FIG. 3 is an enlarged detail view X of FIG. 2 showing the one piece front end part.

The passenger car 1 shown in FIG. 1 has a body 2 and wheels 3. In a front-end area 4, the body 2 has an engine hood 5, a covering 6 made of an elastic material, fenders 7 and a front end part 9 running longitudinally along the bottom portion of the vehicle and facing road 8.

As shown in FIG. 2, for the cooling of the brake 10 arranged at each wheel 3, two air-guiding channels 11 are provided at the front-end part 9 extending at a distance from a central longitudinal plane C—C of the vehicle, the free ends 12 of air-guiding channels 11 being aimed directly or indirectly at the brakes 10 (FIG. 2).

According to the preferred embodiment of the invention, the air-guiding channels 11 are constructed in one piece with the front-end part 9, in which case each air-guiding channel 11, at least over a partial area A of its longitudinal course, is represented by a groove 13 of the front-end part 9 that is open in the direction of the road 8. As shown in FIGS. 2 and 5, the groove 13 has an approximately u-shaped profiled cross-section that expands in a flow direction B of the cooling air.

The groove 13 is defined by two upright extending lateral webs 14, 15 and an upper limiting wall 16 that connects the two webs 14, 15 with one another (FIG. 5). The webs 14, 15 are the highest at the rear end 12 of the groove 13 and end in a wedgeshape—when viewing in the driving direction. In bottom view, FIG. 2, the two webs 14, 15 widen to a funnel-shape in the direction of the wheels 3. The width of the groove 13 depends on the required amount of air and can be determined empirically. The air-guiding channels 11 may extend in parallel to the longitudinal center plane C—C or at an angle to it (FIG. 2).

The upper limiting wall 16, in the area of its front end 17, has its smallest distance (measurement D) to the road 8. Behind end 17, wall 16 rises slightly toward the rear and has its largest distance (convex shaping with respect to the road 8) near the brake. According to FIGS. 1 and 2, the front-end part 9 is connected with a spoiler 18 that is arranged below the covering 6 and is held in position at it by fastening means that are not shown in detail. In longitudinal section, the underside of the spoiler 18 has a convex shaped profile aimed to the outside. The spoiler 18 extends over an essential part of the width of the vehicle and in sections forms an underfloor covering 19. Corresponding to FIG. 6, the spoiler 18 represents the front section on a multi-part underfloor covering 19 that in addition comprises sections 20, 21. The two sections 20, 21 of the underfloor covering 19 located behind the spoiler 18 are aligned approximately horizontally.

In certain preferred embodiments of the invention, front end parts 9 are constructed as one piece with spoiler 18.

In FIG. 2, a blade-type deflecting element 22 is provided behind the free end 12 of the air-guiding channel 11 at a wheel guiding member that is not shown. By means of this deflecting element 22, the cooling air, after flowing through the groove 13, is further guided in the direction of the brakes 10, thus cooling these brakes. The deflecting element 22 is approximately in alignment with the interior web 15 of the groove 13 (FIG. 2). The groove 13 ends in the area of the wheel 3. However, it is also contemplated to provide embodiments which do not exhibit this type of deflecting element 22 and to lengthen the groove 13 toward the rear in such a way that the flow is aimed directly at the brakes 10. Such an alternative embodiment is schematically depicted in dash lines at 22A at the right hand side of the vehicle as shown in FIG. 2 (top of figure).

The air-guiding duct 11 may either be open in the direction of the road 8 over its whole longitudinal course (not shown) or it may, adjacent to its rear end 12, be closed toward the bottom by means of an aerofoil-type profiled web 23. This web 23 with respect to a horizontal auxiliary plane E—E of FIG. 4 is placed in such a way that the cooling air is deflected upwards in the direction of the front axle or the brake 10.

Although the present invention has been described and illustrated in detail, it is clearly understood that the same is by way of illustration and example only, and is not to be taken by way of limitation. The spirit and scope of the present invention are to be limited only by the terms of the claims.

What is claimed is:

1. Vehicle brake cooling arrangement for direction cooling air to vehicle wheel brakes in response to movement of a vehicle, comprising
a structural component for a bottom front portion of a motor vehicle;
cooling air inlet means in said component, said inlet means configured along an underside of said component to admit a flow of brake cooling air in response to vehicle movement:
cooling air outlet means disposable adjacent vehicle brake means to direct a flow of brake cooling air there against;
brake cooling air guide channel means connecting the cooling air inlet and outlet means, said guide channel means being open in a downward direction along a substantial portion of its logitudinal length to thereby control the flow of cooling air entering the air inlet means to improve vehicle aerodynamic characteristics, said guide channel means extending upwardly in the rearward direction toward the cooling air outlet means when in an in use position on said vehicle.

2. An arrangement according to claim 1, further comprising deflecting means to further direct said air towards said brake means.

3. An arrangement according to claim 1, wherein said air guide channel means includes a pair of air guide channels, one each for guiding air to respective front vehicle brakes at opposite sides of the vehicle.

4. An arrangement according to claim 3, wherein each of said air guide channels exhibits a U-shaped cross-sectional profile with lateral walls connected by respective upper wall portions to form a downwardly open U-shape when in an in use position on a vehicle.

5. An arrangement according to claim 4, wherein the cross-sectional air flow area of said air guide channels increases in a funnel like configuration in a direction toward the cooling air outlet means.

6. An arrangement according to claim 1, wherein the guide channel means includes aerofoil-type profiled web member means which close the air guide channel means at the bottom in the area of the cooling air outlet means.

7. An arrangement according to claim 3, wherein the guide channel means includes an aerofoil-type profiled web member which closes each of the respective air guide channels at their bottoms in the area of the cooling air outlet means.

8. An arrangement according to claim 1, wherein the cross-sectional air flow area of said air guide channels increases in a funnel like configuration in a direction toward the cooling air outlet means.

9. An arrangement according to claim 1, wherein said structural component is a spoiler which extends from a front end portion of a vehicle bottom rearwardly to the air outlet means, said spoiler extending laterally of the vehicle with a central spoiler section interconnecting the respective air guide channels.

10. An arrangement according to claim 1, further comprising deflecting element means extending alongside a vehicle wheel and including means for deflecting cooling air flowing through the guide channel means toward the vehicle brake means.

11. An arrangement according to claim 14, further comprising deflecting element means extending alongside a vehicle wheel and including means for deflecting cooling air flowing through the guide channel means toward the vehicle brake means.

12. An arrangement according to claim 11, wherein said deflecting element means are formed separately of the structural component.

13. An arrangement according to claim 12, wherein each of said air guide channels exhibits a U-shaped cross-sectional profile with lateral walls connected by respective upper wall portions to form a downwardly open U-shape when in an in use position on a vehicle, and wherein said deflecting element means includes a respective deflecting element aligned with downstream ends of each lateral wall of the air guide channel disposed closest to a vehicle center line.

14. An arrangement according to claim 13, wherein the guide channel means includes aerofoil-type profiled web member means which close the air guide channel means at the bottom in the area of the cooling air outlet means.

15. An arrangement according to claim 5, further comprising deflecting element means extending alongside a vehicle wheel and including means for deflecting cooling air flowing through the guide channel means toward the vehicle brake means.

16. An arrangement according to claim 15 wherein the guide channel means includes aerofoil-type profiled web member means which close the air guide channel means at the bottom in the area of the cooling air outlet means.

* * * * *